US007226087B2

(12) United States Patent
Alasia et al.

(10) Patent No.: US 7,226,087 B2
(45) Date of Patent: Jun. 5, 2007

(54) SYSTEM AND METHOD FOR AUTHENTICATING AN ARTICLE

(75) Inventors: Alfred V. Alasia, Lake Worth, FL (US); Thomas C. Alasia, Lake Worth, FL (US); Alfred J. Alasia, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 430 days.

(21) Appl. No.: 10/926,489

(22) Filed: Aug. 25, 2004

(65) Prior Publication Data

US 2005/0052017 A1 Mar. 10, 2005

Related U.S. Application Data

(63) Continuation-in-part of application No. 10/655,831, filed on Sep. 5, 2003, now Pat. No. 6,980,654.

(51) Int. Cl.
*B42D 15/00* (2006.01)
*B42D 15/10* (2006.01)
*G09C 3/00* (2006.01)

(52) U.S. Cl. .......................... 283/74; 283/72; 283/117; 283/901; 283/902; 428/29

(58) Field of Classification Search .................. 428/29, 428/195.1; 283/72, 74, 117, 901, 902, 94; 399/366; 101/483, 491
See application file for complete search history.

(56) References Cited

U.S. PATENT DOCUMENTS 3,524,395 A 8/1970 Alasia
3,635,778 A 1/1972 Rice et al.
3,642,346 A 2/1972 Dittmar
3,784,289 A 1/1974 Wicker
3,937,565 A 2/1976 Alasia
4,092,654 A 5/1978 Alasia
4,198,147 A 4/1980 Alasia
4,303,307 A 12/1981 Tureck et al.
4,715,623 A 12/1987 Roule et al.
4,891,254 A * 1/1990 Bianco ........................ 428/68
4,892,385 A * 1/1990 Webster et al. ............. 359/572
4,914,700 A 4/1990 Alasia
5,027,401 A 6/1991 Soltesz
5,113,213 A 5/1992 Sandor et al.
5,178,418 A 1/1993 Merry et al.
5,195,435 A 3/1993 Morrone et al.
5,197,765 A * 3/1993 Mowry et al. ................ 283/93
5,199,744 A * 4/1993 Shenton ....................... 283/91
5,282,651 A * 2/1994 Alonso ....................... 283/117

(Continued)

FOREIGN PATENT DOCUMENTS

EP 0598357 B1 5/1994

(Continued)

*Primary Examiner*—Monica Carter
*Assistant Examiner*—Pradeep Battula
(74) *Attorney, Agent, or Firm*—Hunton & Williams LLP

(57) ABSTRACT

A method of applying an authentication image to an article is presented. The method comprises obtaining a digitized version of the authentication image, encoding the digitized version of the authentication image to produce an encoded latent image, and printing the encoded latent image on a printable surface of the article containing a primary image using a transmittent printing medium.

10 Claims, 5 Drawing Sheets

U.S. PATENT DOCUMENTS

| | | | | |
|---|---|---|---|---|
| 5,303,370 | A | 4/1994 | Brosh et al. | |
| 5,396,559 | A | 3/1995 | McGraw | |
| 5,432,329 | A * | 7/1995 | Colgate et al. | 235/487 |
| 5,438,429 | A | 8/1995 | Haeberli et al. | |
| 5,708,717 | A | 1/1998 | Alasia | |
| 5,735,547 | A | 4/1998 | Morelle et al. | |
| 5,830,609 | A | 11/1998 | Warner et al. | |
| 5,904,375 | A | 5/1999 | Brugada | |
| 5,944,356 | A * | 8/1999 | Bergmann et al. | 283/86 |
| 5,974,150 | A | 10/1999 | Kaish et al. | |
| 5,999,280 | A * | 12/1999 | Huang | 359/2 |
| 6,084,713 | A | 7/2000 | Rosenthal | |
| 6,089,614 | A * | 7/2000 | Howland et al. | 283/91 |
| 6,104,812 | A | 8/2000 | Koltai et al. | |
| 6,171,734 | B1 | 1/2001 | Warner et al. | |
| 6,177,683 | B1 | 1/2001 | Kolesar et al. | |
| 6,222,650 | B1 | 4/2001 | Long | |
| 6,252,963 | B1 | 6/2001 | Rhoads | |
| 6,256,150 | B1 | 7/2001 | Rosenthal | |
| 6,280,891 | B2 | 8/2001 | Daniel et al. | |
| 6,343,138 | B1 | 1/2002 | Rhoads | |
| 6,369,919 | B1 * | 4/2002 | Drinkwater et al. | 359/2 |
| 6,414,794 | B1 | 7/2002 | Rosenthal | |
| 6,974,080 | B1 * | 12/2005 | Goggins | 235/462.01 |
| 2001/0005570 | A1 | 6/2001 | Daniel et al. | |
| 2002/0008380 | A1 | 1/2002 | Taylor et al. | |
| 2002/0054680 | A1 | 5/2002 | Huang et al. | |
| 2002/0185857 | A1 | 12/2002 | Taylor et al. | |
| 2003/0012562 | A1 | 1/2003 | Lawandy et al. | |
| 2003/0015866 | A1 | 1/2003 | Cioffi et al. | |
| 2003/0025318 | A1 * | 2/2003 | Patton et al. | 283/72 |
| 2003/0136837 | A1 | 7/2003 | Amon et al. | |
| 2003/0137145 | A1 | 7/2003 | Fell et al. | |
| 2005/0225080 | A1 * | 10/2005 | Wicker | 283/117 |

FOREIGN PATENT DOCUMENTS

| | | | |
|---|---|---|---|
| EP | 1147912 | A2 | 10/2001 |
| GB | 1407065 | | 9/1975 |
| WO | WO 92/04692 | | 3/1992 |
| WO | WO 93/15491 | | 8/1993 |
| WO | WO 94/07326 | | 3/1994 |
| WO | WO 98/15418 | | 4/1998 |
| WO | WO 01/87632 | A1 | 11/2001 |

* cited by examiner

SYSTEM AND METHOD FOR AUTHENTICATING AN ARTICLE

RELATED APPLICATIONS

This application is a continuation-in-part of U.S. patent application Ser. No. 10/655,831 filed Sep. 5, 2003, now U.S. Pat. No. 6,980,654 the entirety of which is hereby incorporated by reference in its entirety.

FIELD OF THE INVENTION

This invention relates generally to anti-counterfeiting measures and more particularly to methods for applying a non-reproducible authentication image to an article or articles.

BACKGROUND OF THE INVENTION

Identity theft and black market sales of counterfeit goods are significant problems faced with increasing regularity in today's world. Each year many millions of dollars are lost through the fraudulent use of non-authentic documents and branded goods. The increasing sophistication of optical scanners, copy machines and other devices used for replicating items and identification labels continues to enhance the counterfeiter's ability to produce fraudulent documents and other imitations which are of sufficient quality to often go undetected.

One method of providing increased security involves applying to the article some form of indicia, typically a text string or other image, that has been encoded so that the image cannot be viewed by the unassisted eye. The encoded image can be viewed only through the use of a decoding device that "re-assembles" the image as it appeared prior to being encoded.

High resolution scanning devices create a possibility that even these images may be subject to reproduction. Replication devices, such as optical scanners for example, generally operate by detecting reflection of light cast onto an item by the scanner. Areas of the item that have large amounts of pigment will absorb more light than areas that have little or no pigment. The scanner may measure the amount or intensity of the reflected light that is recorded as computer data by the scanner. This data is then used by the scanner to generate a replica of the scanned item, usually as either a printed copy or a digital image. This replica may be of sufficient quality that the encoded printed indicia may also be replicated. In such a case, using the decoder to view the replicated article may not reveal its counterfeit nature.

SUMMARY OF THE INVENTION

An illustrative embodiment of the invention provides an authenticatable article comprising a printable surface and a latent image formed on a first portion of the printable surface in a transmittent printing medium. The latent image is an encoded version of an authentication image and is configured for optical decoding by an optical decoder so that the authentication image can be viewed through the optical decoder when the optical decoder is placed over the latent image.

Another illustrative embodiment of the invention provides a method of applying an authentication image to an article. The method comprises obtaining a digitized version of the authentication image, encoding the digitized version of the authentication image to produce an encoded latent image, and printing the encoded latent image on a printable surface of the article using a transmittent printing medium.

DETAILED DESCRIPTION OF THE INVENTION

Figure 1:
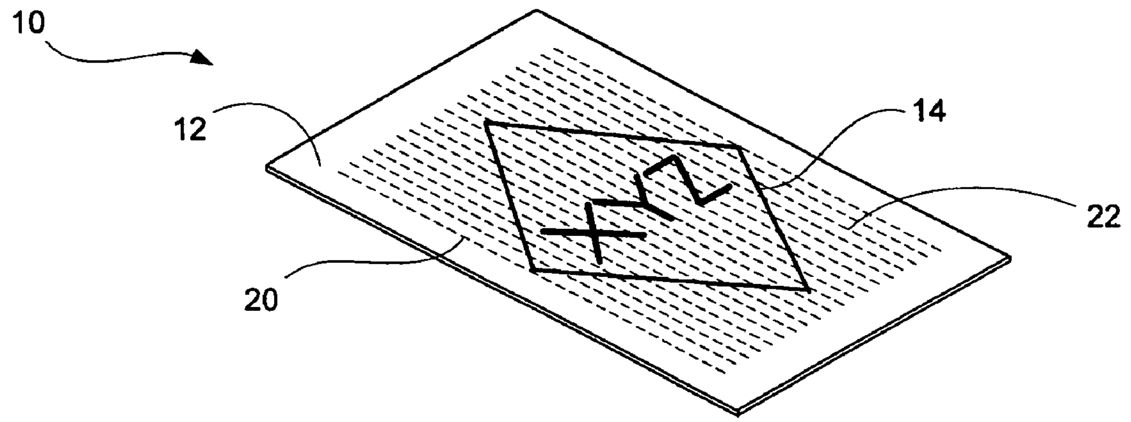
FIG. 1 is a perspective view of an authenticatable article according to an embodiment of the invention.

Previously used methods of applying an encoded image to an article for purposes of authenticating or identifying the article have involved printing the encoded image with pigmented ink or toner. One approach is to break the original image into disparate pieces. The encoded image is essentially invisible to the naked eye until viewed through a lens having optical characteristics that "reassemble" the image.

A process of encoding that involves rasterization and printing of a latent image is described in U.S. Pat. No. 5,708,717 ('717 Patent), which is incorporated herein by reference in its entirety. In this process, the latent image is rasterized with a certain frequency that may correspond, for example, to a certain number of printed lines per inch. The encoded image is then printed onto the item using one or more of the four primary color printing inks generally used for printing visible indicia. If the article to be printed is to carry a visible image along with the latent image, the visible image is also rasterized at the selected frequency so that the latent image may be adjusted according to the color and density of the various parts of the visible image. The latent image and the visible image are then printed together on the article, with the visible image reproduced in its assembled (i.e., visible) form and the latent image in its encoded (i.e., invisible) form. The latent image becomes visible only when a decoding lens constructed for the selected frequency of the latent image is placed over the latent image.

In the method of the '717 Patent, the latent image is produced using pigmented ink or toner that produces markings that may be visible to advanced scanning devices. Further, this method may require that any visible image to be printed on the article be digitized and rasterized to allow adjustment of the latent image. The visible image must then be printed at the same time as the latent image.

The embodiments of the invention described herein provide methods of applying a latent images to an article that are less susceptible to reproduction and that allow for processing and printing of the latent images independent of any visible image to be printed on the article. These methods involve printing encoded images on an article using a substantially transmittent print medium. As used herein, the term "transmittent print medium" means a print medium that allows passage of light through the print medium without a significant degree of reflection of the incident light in a direction normal to the surface on which the print medium is applied. A transmittent print medium is not perfectly transparent and thus produces a subtle change in the reflectivity of the substrate upon which it is applied. When latent images are printed with a transmittent print medium in accordance with the invention, the resulting small variations in reflectivity may be insufficient to allow the disparate pieces of the image to be viewed by the human eye. Moreover, the variations in reflectivity are sufficiently small that they cannot be discerned or replicated by copiers or scanning devices. They are, however, large enough so that when the disparate pieces of the image are assembled by a decoder to form a complete image, the image is discernable.

The ability to avoid detection by a scanner can be maximized by minimizing the contrast between areas covered by the transmittent medium and areas that are not covered by the transmittent medium. It has been found that a transmittent medium that provides a contrast with the uncoated areas of the substrate of less than about 5% (i.e., changes the reflectivity of the substrate by less than 5%) will not be discernible or reproducible by typical scanning devices or copiers. It has also been found that a contrast as low as 0.5% may be sufficient to produce a discernible image with a decoder. Further improvements to the decoder may reduce the required contrast even further. Highly satisfactory results have been achieved with images printed using transmittent media that produce a contrast with the substrate in a range of about 0.5% to about 1.5%.

The invention will now be described in more detail with reference to the drawings.

Figure 2:
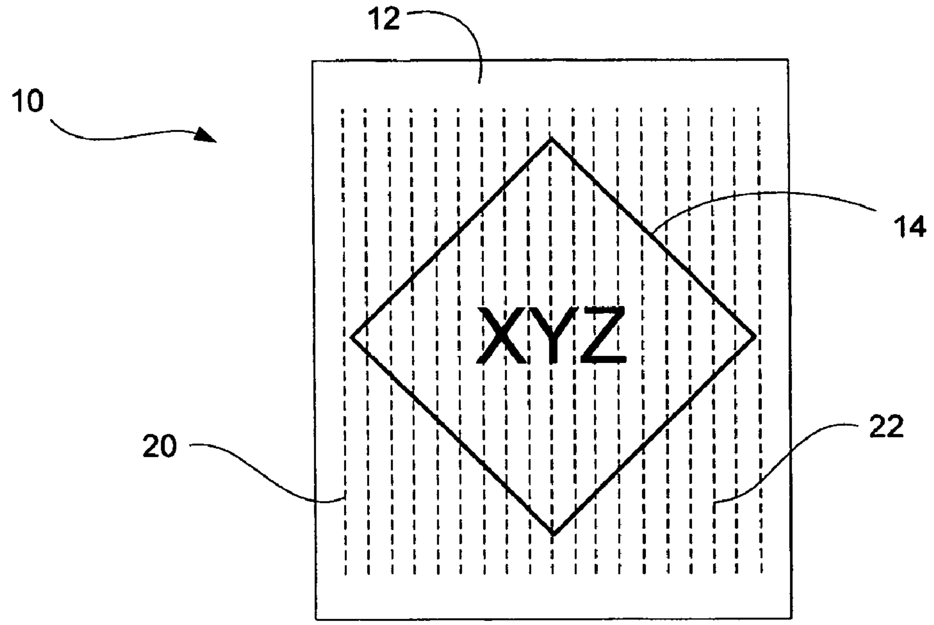
FIG. 2 is a top plan view of the authenticatable article illustrated in FIG. 1.

With reference to FIGS. 1 and 2, an article 10 to be authenticated has a printable surface 12 that is adapted for carrying some form of printed indicia. The article 10 may include a primary image 14 printed on the printable surface using pigmented ink, toner or other print medium and a latent image 20 to be used to authenticate the article 10.

It will be understood by those of ordinary skill in the art that the article 10 may be of any size and shape so long as there is a portion of the surface of article 10 that is capable of receiving printed indicia. For simplicity, the article 10 is illustrated as a thin, planar member that is representative of such articles as labels, tags, currency or tickets. The article 10, or at least the portion of the article 10 with the printable surface 12, may be any material capable of receiving and retaining print media including, but not limited to, paper, vinyl, cloth, metal, acrylics, polystyrene, polyester, polycarbonate, nylon, and polyethylene.

The printable surface 12 may be printed with a solid or patterned background, the primary image 14 or both a background and the primary image 14. The primary image 14 may comprise any form of graphical image, photograph illustration or text. The background and/or primary image 14 may be printed in ink or toner, either in grayscale or color using any known method. In color printing applications, the initial printing may include any four color printing process. As is known in the art, a four color printing involves the application of separate layers of the four primary printing colors (cyan, magenta, yellow and black) to create a full color image. Suitable printing methods include, for example, lithography or offset, intaglio, letterpress, flexography, and gravure, for example. Digital printing techniques such as inkjet and laser printing may also be employed.

Figure 3:
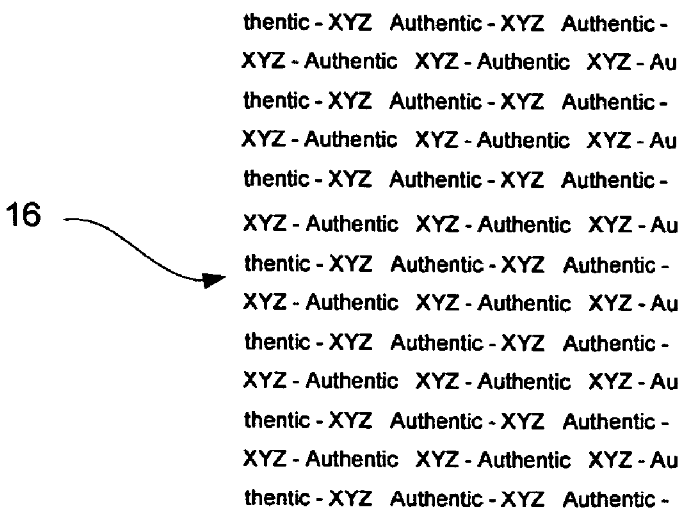
FIG. 3 is an exemplary authentication image that may be used in embodiments of the invention.

The article 10 also includes a latent image 20 that is printed on the printable surface 12 using a substantially transmittent printing medium. The latent image 20 is an encoded version of a selected authentication image 16 to be used to authenticate the article 10. The authentication image 16 may be a single graphical image or, as shown in FIG. 3, a wallpaper pattern using text or graphics in a repeating geometric or random pattern. The authentication image 16 may feature, for example, a single or repeated display of a message, corporate logo or other trademark.

The latent image 20 comprises a plurality of image fragments that can be assembled or decoded to allow the authentication image 16 to be viewed. In the exemplary embodiment illustrated in FIGS. 1-4, the latent image 20 is a rasterized version of the authentication image 16 and comprises a plurality of parallel lines 22 printed at a predetermined number of lines per inch (frequency). A typical line frequency would be in a range of about 50 lines per inch to about 300 lines per inch.

The parallel lines 22 are shown in FIGS. 1 and 2 as dashed lines to indicate that they are not ordinarily visible. It will be understood by those of ordinary skill in the art that the spacing of the lines 22 has been exaggerated for purposes of illustration.

The transmittent printing medium used to print the latent image 20 may be any material suitable for application to the printable surface that produces small variations in reflectivity of the substrate that do not change over time. Suitable materials may include those classified as clear printer's varnishes. As used herein, the term "printer's varnish" refers to coatings such as a liquid shellac or plastic coatings that may be applied to a printed surface to add durability and a glossy, dull or satin finish. Clear overprint varnishes are readily available and can be applied on a substrate by standard offset presses without the installation of special equipment. Examples of suitable clear varnishes include Joncryl 1679 and CDX-562. Clear varnishes such as these can be used to produce the desired variations in reflectivity. The actual contrast with uncoated areas of the substrate may be determined by the varnish used, the thickness of the applied layer and the use of multiple layers.

It should be appreciated that the particular printing medium used may depend on the material and texture of the printable surface and the environment to which the article will be exposed. For example, an article 10 carrying the latent authentication image 20 may be subject to additional processing such as heat-induced shrink wrapping. In such an instance, a transmittent printing medium suitable for high temperature environments may be desirable.

The transmittent printing medium may be applied as a covering layer over the primary image 14. Accordingly, the latent image 20 may partially or completely overlie the primary image 14. Alternatively, the latent image 20 may be printed on a portion of the printable surface that has not otherwise been printed or has been printed with a background color or wallpaper pattern.

In some instances, the latent image 20 may be printed with a transmittent printing medium before the application of a primary image 14. In such instances, the latent image 20 will be viewable through "holes" in the primary image (i.e., areas within the boundaries of the primary image where no ink or pother pigmented medium is applied).

As discussed above, the relative transparency of the transmittent printing medium decreases or eliminates the ability to "see" or reproduce the latent image 20. This feature, in combination with the encoded nature of the latent image 20 makes copying of the authenticating indicia extremely difficult if not impossible.

Figure 4:
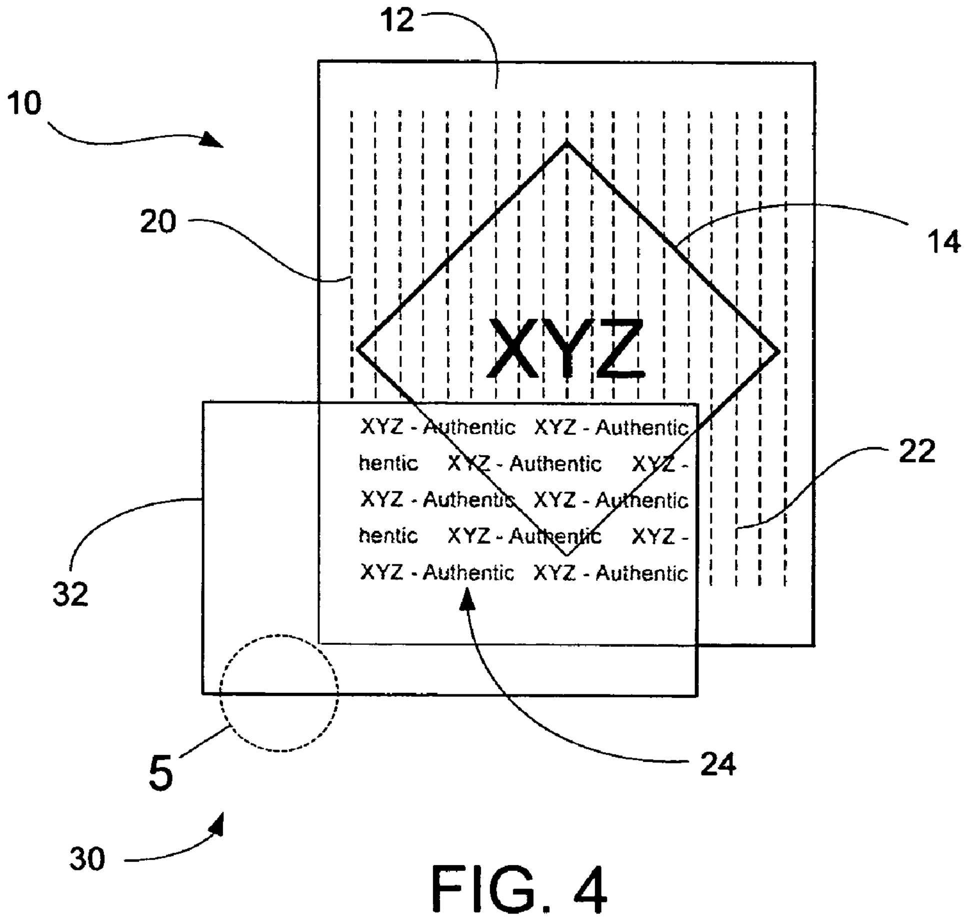
FIG. 4 is a top view of an authenticatable article and a decoder according to an embodiment of the invention.
Figure 5:
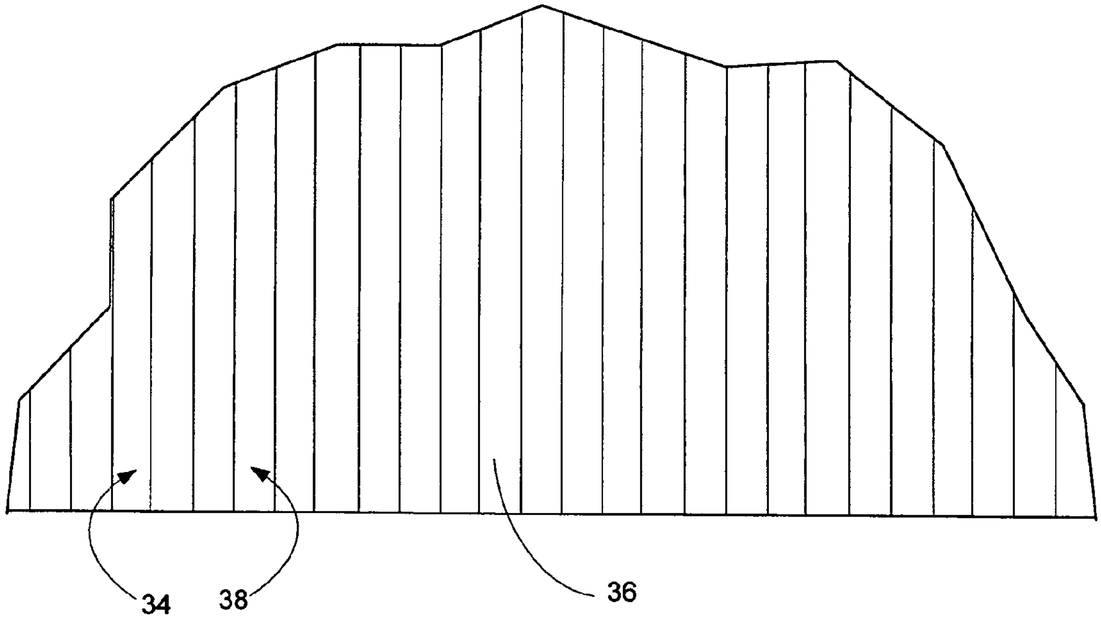
FIG. 5 is a top view of a portion of the decoder illustrated in FIG. 4.
Figure 6:
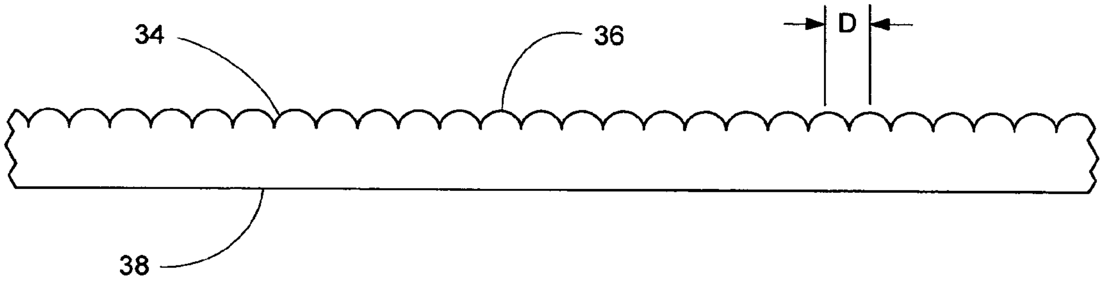
FIG. 6 is a side view of the decoder portion illustrated in FIG. 5.

The latent image 20 allows the authentication image 16 to be seen only through the use of a decoder 30 as shown in FIG. 4. The decoder is designed to have optical characteristics that are matched to the manner in which the authentication image 16 is encoded. In the illustrated embodiment, the decoder 30 comprises a decoding lens 32 manufactured to correspond to the line frequency of the encoded latent image 20. FIGS. 5 and 6 illustrate a portion of a decoding lens 32 that may be used in embodiments of the invention. The decoding lens 32 is a lenticular lens having an upper, viewer-facing surface 34 with a series of curved ridges 36 and a lower, image-facing surface 38 that is substantially flat. The curvature and spacing of the ridges 36 is established so as to optically bring the rasterized fragments of the image 20 together. The regular peak-to-peak distance D between the curved ridges is determined by the desired frequency of the decoding lens 32. The nearer the match of the frequency of the decoding lens 32 to the frequency of the latent image 20, the clearer the authentication image 16 will be when the decoder 30 is used to authenticate the article 10. The authentication image 16 may still be viewed if the frequency of the decoding lens 32 and the latent image 20 are within about 10 lines per inch of one another, although the authentication image 16 may appear distorted. If the difference in frequency between the decoding lens 32 and the latent image 20 is more than about 10 lines per inch, the authentication image 16 may not be viewable using the decoder 30.

Although the illustrated embodiments of the invention show a flat surface and a planar decoder, it will be understood by those of ordinary skill in the art that the printable surface may have a known curvature and the decoder may be configured to account for this curvature to produce a viewable authentication image.

The exemplary decoding lens 32 may be an acrylic or polycarbonate lens, although various other thermoplastic resins may also be used. Typically, the decoding lens 32 may be manufactured from or may include materials having high indices of refraction that enhance the readability of images viewed through the decoder. As is known in the art, the speed of light changes as it passes through different mediums. A particular medium has an index of refraction, which is defined as the speed of light in a vacuum divided by the speed of light through the medium. Materials having indices of refraction that are similar to the refraction index of air may be preferred in order to reduce the distortion of images viewed through the materials.

The thickness of the decoding lens 32 and the radius of curvature of the ridges 36 are a function of the optical characteristic of the material used. For an acrylic lens, a typical lens thickness would be about 90 mils and the radius of curvature of the ridges 36 would be about 30 mils.

Transmission of light passing though the decoder 30 to the latent image 20 may be reduced as a result of reflection of incident light by the decoder 30. This phenomenon, referred to as back reflection, can noticeably decrease the ease with which a latent image 20 printed using a transmittent medium can be discerned. This can necessitate that the contrast of the latent image 20 be increased, which, in turn, increases the likelihood of reproducibility. The back reflection effect may be exacerbated if a decoder 30 is used in an attempt to decode a latent image 20 through a clear wrapping material (e.g., cellophane) such as might be used as an outer packaging material for the article 10. In many instances, the light that is reflected and not transmitted to the latent image 20 may be between about 4% to about 16% of the total incident light. The higher the refractive index of any material through which the light must pass to reach the latent image 20, the less light that is transmitted.

To diminish back reflection and increase the readability of the latent image 20, either or both of the surfaces 34, 38 of the decoder 30 may be coated with an anti-reflective material. The addition of such a material may improve light transmission of the decoder 30 to a range of about 90% to about 99% of the incident light.

Suitable anti-reflective materials may include, for example, a single layer magnesium fluoride coating, a narrowband or "V" multilayer coating, or a broadband multilayer coating. In an illustrative embodiment, a decoding lens 32 may have an anti-reflective coating comprising four or more layers producing a total thickness of about 2-4 microns. The coating may be applied to an entire surface of the lens or to desired portions of either or both of the lens surfaces 34, 38.

The transmittent latent image 20 provides several significant advantages over the prior art. Using previous methods, encoded images must be printed using one of the four pigmented inks of a four color printing process (cyan, magenta, yellow, or black). This essentially requires that the latent image be printed at the same time as the corresponding color layer of the primary image. The use of a primary color also limits the placement of the encoded image to areas that do not contain a high concentration of that color.

In contrast, the latent images 20 of the present invention need not be applied at the time of the primary image 14 or background printing. This significantly enhances the utility and flexibility of the application and use of the authentication markings of the invention. Further, there is no need to adjust the placement of the latent image to avoid particular color concentrations in the primary image 14.

Another advantage is that the transmittent latent image 20 requires no preprocessing or manipulation of the primary image 14. Previous methods may require the digitization and breakdown of the primary image in order to manipulate color separations of the primary inks or spot colors. Spot colors, as is known in the art, are specially mixed inks that are pre-made and applied to a printed page without the use of the primary printing colors used to produce the majority of an image. Areas to be printed with spot colors are not printed with primary ink colors. Thus, when an encoded image is printed using a primary color, the encoded image must be placed outside of any regions printed with spot colors.

In the embodiments of the present invention, however, the latent image 20 is printed separately using a transmittent print medium. There is therefore no restriction on the location of the latent image 20. The latent image 20 can overlie any portion of the primary image 16 including any areas printed using spot colors.

Yet another advantage of printing the latent image 20 in clear varnish is that the image 20 may printed using low resolution. Resolution, typically measured in dots per inch, is a measurement that relates to the quality of a printed image. Printers print images using varying sizes and patterns of spots that are made up of many dots of ink. Printers typically use a halftone grid divided into cells that contain halftone spots. The proximity of cells in the grid is measured in lines per inch. When resolution is low, fewer dots per inch are present and the halftone spots are more obvious in the printed image. When the dots of a latent image are formed from pigmented ink, it is easier for a scanner to replicate a low resolution image than a high resolution image. This is because in high resolution, the dots are of such density that the scanner is unable to discern anything more than a continuous image. Low resolution printing may thus decrease the effectiveness of latent images printed using pigmented ink. When a latent image is printed using a clear print medium, however, the difference between high resolution and low resolution is irrelevant because the scanner cannot discriminate the latent image from the substrate.

The use of a clear print medium thus enables latent images 20 to be printed in a variety of resolutions, from low resolution (corresponding to a frequency of about 50 to 65 lines per inch) to high resolution (corresponding to a frequency at or above 150 lines or more per inch) and any resolution in between. The advantage of using low resolution printing is that it typically involves lower maintenance and lower cost and yet provides a higher level of repeatability than higher resolution processes due to the lower density of material being applied. Repeatability is a term used to describe the ability of a printer to consistently produce identical copies of images.

The ability to print in low resolution also expands the substrates onto which a latent image 20 may be printed. For example, some types of paper, such as newsprint, can only reproduce low resolution images because of the way the paper absorbs ink and how ink spreads out on the paper. As a result, newsprint is typically printed at a resolution of 85 lines per inch. At the other end of the spectrum, high quality coated paper such as that used for magazines may have a resolution of 150 or more lines per inch because there is less ink spread.

An additional advantage of low resolution is that it can be carried out using almost any printing equipment. While most printing presses are capable of printing low to medium resolution imagery, fewer are capable of high resolution output.

Some embodiments of the invention provide for including additives in the transmittent printing medium to fine tune its density or appearance. These materials may be added to the printing medium in small amounts so as to enhance the appearance or readability of the latent image without exceeding the contrast threshold that would allow the latent image to be scanned. Such materials might include dyes, reflective material or iridescent materials. Generally, iridescent materials reflect light only when viewed at an angle other than the perpendicular. Because scanners typically project light perpendicular to the item being scanned, an iridescent material may be added to the transmittent printing medium without affecting the ability of the latent image 20 to avoid detection and reproduction.

Based on the above, it will be understood that the encoded latent image 20 printed on an article using a transmittent printing medium combines with the decoder 30 to provide a system for authenticating the article. In this system, the decoder 30 is configured to overlie the encoded latent image 20 and, through its optical characteristics, decode the latent image 20 so that an authentication image 16 may be viewed. In some embodiments, the latent image 20 may be a rasterized version of the authentication image 16, the latent image 20 being printed with a predetermined line frequency. In such embodiments, the decoder may comprise a lenticular lens 32 configured with a corresponding frequency so that when the lenticular lens 32 is placed over the latent image 20, the authentication image 16 may be viewed. The lens may be configured so that the lens frequency matches the line frequency of the latent image 20 within about plus or minus 10 lines per inch.

Figure 7:
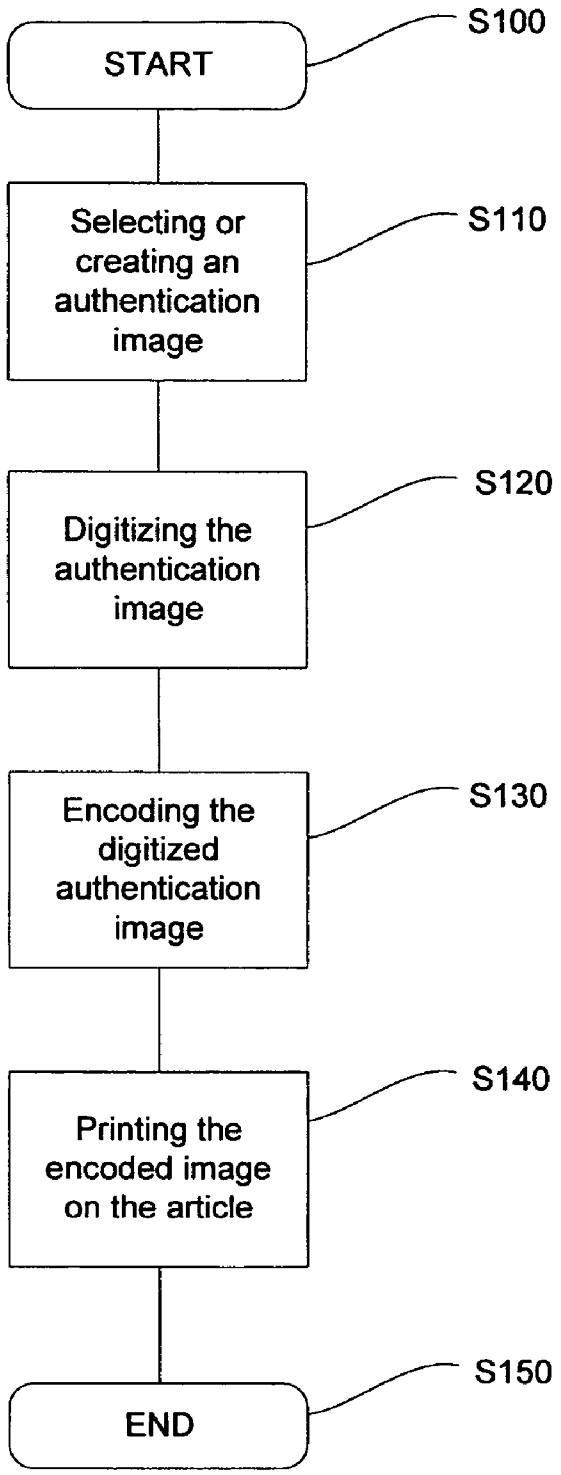
FIG. 7 is a flow diagram of a method of applying an authentication image according to an embodiment of the invention.

FIG. 7 shows a flowchart of a method of applying an authentication image 16 to an article 10 in accordance with an embodiment of the invention. The method begins at S100. At S110, an authentication image 16 is selected or created. The authentication image 16 may comprise text, original artwork or an existing logo or trademark. The authentication image 16 may be derived from photographs, illustrations or printed text or any other indicia desired by the user that can provide a mark of authenticity. As previously noted, the authentication image 16 may be a single image or a wallpaper-style pattern.

At S120, the authentication image 16 is digitized for storage and/or processing by a data processing system. A pre-existing authentication image 16 may be digitized in any known manner such as by scanning. It will be understood that the authentication image 16 may also be created in a digital format such as through the use of digital photographic equipment or through the use of a computer.

At S130, the digitized authentication image 16 is encoded to produce an encoded image using a data processing system and software adapted for the encoding task. To accomplish this, the digitized authentication image 16 may be subjected to any of various encoding or encryption techniques. As discussed above, one such technique (described in the '717 Patent) involves the rasterization of the authentication image 16. In an embodiment of the method adapted for using the rasterization technique, the encoding software breaks down the digitized authentication image 16 to create a series of equally spaced lines having a frequency of a user specified number of lines per inch. Any frequency may be used, although it may be advantageous to select a frequency that is typically used in the printing arts. Typical printing frequencies may be in a range from about 50 lines per inch to about 150 lines per inch.

The encoded image may be saved as a separate, new image file for use in creating printing plates or screens. In certain printing processes, such as lithography, this may involve generating full size films using a high-resolution imagesetter in either positive or negative format. The films may then be used to generate flexible printing plates to be attached to plate cylinders of a lithographic printing press.

The encoded image is used to print an encoded latent image 20 on a printable surface 12 of the article 10 at S140. The encoded latent image 20 is printed using a transmittent printing medium so that the elements of the latent image 20 cannot be discerned by direct viewing or by a scanning device. In some embodiments of the invention, the transmittent printing medium may be a clear printer's varnish that can be applied using standard printing techniques. The latent image 20 may be printed with clear printer's varnish in a manner consistent with printing standards set by the Graphical Arts Technical Foundation for a given printing process.

In some instances, the printable surface 12 will already have been printed with a background or a primary image 14 using ink, either in grayscale or color. Any initial printing on the surface 12 may be accomplished by any known method. In color printing applications, the initial printing may include any four color printing process. Suitable printing methods may include lithography or offset, intaglio, letterpress, flexography, and gravure, for example. Digital printing techniques such as inkjet and laser printing may also be used.

If some or all of the printable surface 12 has been pre-printed with a background or primary image 14, the latent image 20 may be printed over the background or primary image 14. The printing of the latent image 20 may, in fact, be carried out as a final step of an overall printing process that includes the initial printing. For example, the latent image 20 may be printed by adding a layer of clear printer's varnish on the printed substrate just as if a fifth color were being added to the traditional four color printing process. Alternatively, the latent image 20 may be printed entirely separately from the background or primary image 16 using separate printing equipment. As a result, the latent image 20 may be added at a completely different facility or by a different manufacturer than the initial printing on the article 10. The latent image 20 may even be applied at a point of sale of the article 10.

Where the printable surface is already printed upon, i.e. contains one or more primary images, it may be particularly effective to apply at least a portion of the latent image in the transmittent printing medium over a primary image that comprises "line work" or a broken image, i.e. one that has closely, but irregularly, spaced lines and/or shapes, typically which contain two or more colors that contrast. For example, the line work may be a bar code, such as a Universal Product Code (UPC).

When a latent image is printed in a transmittent printing medium, the latent image may result in a noticeable reduction in gloss level where the latent image has been printed. This reduction may alert some sophisticated counterfeiters that a product printed with a latent image in a trasmittent medium has been altered. Although it may not be apparent what type of alteration has occurred or that a latent image is present, the alteration may invite the counterfeiter to further investigate the product. Printing the latent image over a line work primary image as described above, particularly one that has alternating contrasts and irregular variation in line spacing such as a bar code, may be particularly helpful in preventing a noticeable difference in gloss level where the latent image has been printed in the transmittent printing medium. As one views the line work with the naked eye, one's vision is typically slightly distorted by the irregularity of that image. Further, the same alternating contrasts and varied line spacings of the line work also decrease an optical scanner's ability to perceive and/or replicate the latent image if the article is scanned.

Figure 8:
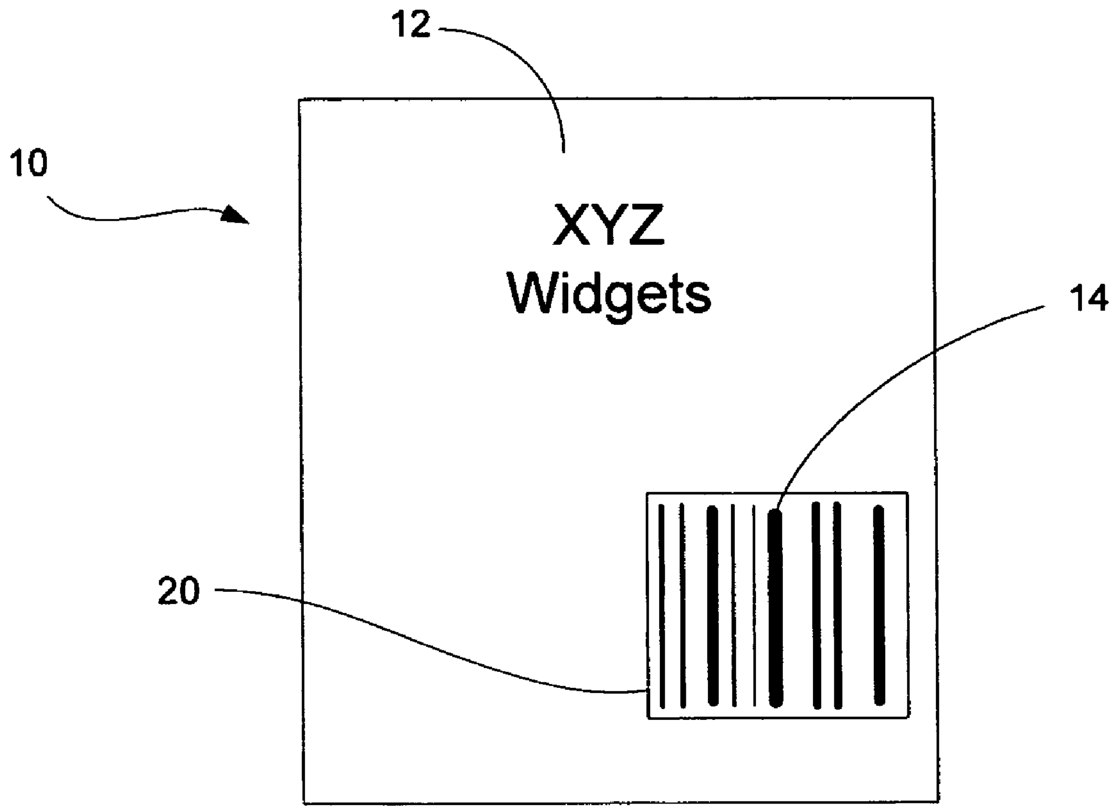
FIG. 8 is a top plan view of an authenticatable article applied to a printed surface.

As shown in FIG. 8, the printable surface 12 of the article 10 includes a primary image 14 that is a UPC symbol. The UPC symbol is line work that includes a series of irregularly spaced lines of varying thickness. In the embodiment shown in FIG. 8, the latent image 20 is preferably printed in the transmittent printing medium applied over the printable surface 12 such that substanially all of the latent image is printed over the area of the printable surface 12 that contains the primary image 14. Thus, the latent image 20 extends only partially, if at all, beyond the edges of the UPC symbol. For clarity in FIG. 8, the area where the latent image 20 appears is shown as a box, rather than as a series of broken lines as shown in FIGS. 1 and 2.

In addition to printing the latent image over a line work primary image to disguise any change in gloss level, the change in gloss level itself may be directly controlled through the use of halftone screens used to apply the transmittent printing medium. The halftone screens may be used to gradually change the density of the transmittent printing medium. This change in density results in a gloss level that gradually increases as distance from the from the latent image increases. In this manner, any reduction in gloss level that may result from printing the latent image is spread over a greater area, reducing the likelihood that one viewing the article would be alerted to the presence of the latent image. Changes in gloss level may be particularly effective when used in combination with printing over line work.

Although the latent image 20 will often be printed over an earlier printing, it may also be printed directly to an unprinted portion of the printable surface 12. The latent image may, for example, be printed directly onto paper which has not previously been printed on. As noted above, a primary image or other printing could be applied subsequent to the latent image with at least a portion of the latent image showing through unprinted areas of the primary image.

Referring again to FIG. 7, once the article 10 has been printed with the latent image 20, the article can be forwarded for distribution, further packaging or additional printing. The method ends at S150.

The invention also provides methods for verifying the authenticity of a suspect article where authentic articles are printed with an encoded latent image 20 using a transmittent printing medium and non-authentic articles are not. The latent image 20 corresponds to a predetermined authentication image 16 selected by the provider of authentic articles. The method involves obtaining a decoder 30 that is configured to be placed over a target location of the suspect article where the encoded latent image 20 would be if the article is authentic. The decoder is further configured with optical characteristics that can decode the latent image 20 so that an authentication image 16 may be viewed if present. The method further involves placing the decoder 30 over the target location on the suspect article and viewing the target location through the decoder. A determination is then made whether the authentication image 16 is visible. Responsive to a determination that the authentication image 16 is present, the suspect article is identified as authentic. Responsive to a determination that the authentication image 16 is not present, the suspect article is identified as non-authentic.

In methods for verifying the authenticity of a suspect article where the latent image 20 is a rasterized version of the authentication image 16 printed with a predetermined line frequency, the decoder 30 may comprise a lenticular lens 32 having a lens frequency that matches the line frequency of the latent image 20 within about plus or minus 10 lines per inch.

There are many examples of the use of the methods of the invention, and methods of verifying authenticity according to the invention may be carried out at any time. For example, customs officials may verify passports containing encoded latent images upon entry or departure from the United States, and corporate investigators may verify the authenticity of branded goods housed in their distributors' warehouses.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. An authenticatable article comprising:

a printable surface with a primary image printed thereon;

a latent image formed on a first portion of the printable surface in a transmittent printing medium, at least a portion of the latent image formed over a portion of the primary image, the latent image being an encoded version of an authentication image and being configured for optical decoding by an optical decoder so that the authentication image can be viewed through the optical decoder when the optical decoder is placed over the latent image, wherein the primary image comprises line work.

2. The authenticatable article of claim 1 wherein the line work is a bar code.

3. The authenticatable article of claim 1 wherein the transmittent printing medium comprises a clear printer's varnish.

4. The authenticatable article of claim 1 wherein the transmittent printing medium includes one or more materials selected from the set consisting of a dye and an iridescent material.

5. A system for authenticating an article, the system comprising:

a latent image formed in a transmittent printing medium on a printable surface of the article having a primary image printed thereon, at least a portion of the latent image formed over at least a portion of the primary image and being configured as an encoded version of an authentication image using an optically decodable coding scheme; and an optical decoder comprising a lens adapted for placement over at least a portion of the latent image, the lens having optical decoding properties corresponding to the optically decodable coding scheme for decoding the latent image when the lens is placed over the latent image, thereby allowing the authentication image to be viewed through the lens, wherein the primary image comprises a bar code.

6. A method of applying an authentication image to an article, the method comprising:

obtaining a digitized version of the authentication image;

encoding the digitized version of the authentication image to produce an encoded latent image; and printing the encoded latent image on a first portion of a printable surface of the article using a transmittent printing medium, the comprising a primary image on the printable surface wherein at least a portion of the encoded latent image is printed over at least a portion of the primary image and wherein the primary image comprises line work.

7. The method of claim 6 wherein the line work comprises a bar code.

8. The method of claim 6 wherein substantially all of the encoded latent image is printed over the primary image.

9. The method of claim 6 wherein the transmittent printing medium is applied to the first portion of the printable surface of the article using a plurality of halftone screens, wherein the transmittent printing medium is applied at varying densities on the printable surface.

10. The method of claim 9 wherein the varied densities of the applied transmittent printing medium results in a gradual increase in a gloss level of the article as the distance from the latent image printed on the first portion of the printable surface increases.

* * * * *